United States Patent [19]

Yamashita

[11] Patent Number: 5,471,392

[45] Date of Patent: Nov. 28, 1995

[54] GEOGRAPHIC INFORMATION DISPLAY APPARATUS

[75] Inventor: Kenyu Yamashita, Fukuoka, Japan

[73] Assignee: Matsushita Electric Industrial Co., Ltd., Osaka, Japan

[21] Appl. No.: 261,079

[22] Filed: Jun. 16, 1994

[30] Foreign Application Priority Data

Aug. 17, 1993 [JP] Japan .................................. 5-203151

[51] Int. Cl.$^6$ .................................................. G06F 165/00
[52] U.S. Cl. ........................................... 364/443; 340/995
[58] Field of Search ..................................... 364/449, 443, 364/444, 460; 340/990, 995; 395/153, 156, 161, 600

[56] References Cited

U.S. PATENT DOCUMENTS

| | | | |
|---|---|---|---|
| 4,954,959 | 9/1990 | Moroto et al. | 364/449 |
| 5,067,081 | 11/1991 | Person | 364/444 |
| 5,107,433 | 4/1992 | Helldorfer et al. | 364/444 |
| 5,283,894 | 2/1994 | Deran | 395/600 |
| 5,334,974 | 8/1994 | Simms et al. | 340/990 |

*Primary Examiner*—Michael Zanelli
*Attorney, Agent, or Firm*—Lowe, Price, LeBlanc & Becker

[57] ABSTRACT

A geographic information display apparatus comprises a memory for memorizing graphic data of maps, terminological information representing various names including place names, route names and facility names on maps, position information representing latitude and longitude data corresponding to the names, and index information including a number of names to be retrieved as a designated name. A retrieval device executes a retrieval operation using the index information of the memory on the basis of a name inputted by an input device. The input device allowing a user to select one of resultant names after the retrieval operation of the retrieval device is finished. A display unit displays a map corresponding to the name selected by the input device. Upon user's designation of one spot on the map displayed on the display unit, a register memorizes the designated spot in terms of position information with respects to the selected name. An adding device writes a mark at the designated spot on the map displayed on the display unit. And, a readout device reads out names stored in the register, and the display unit displays the names read out by the readout device, and further the input device selects one of the names displayed on the display unit. A controller controls the readout device to read out a map affixing the mark thereon on the basis of the position information, and also controls the display unit to display the map read out by the readout device.

24 Claims, 7 Drawing Sheets

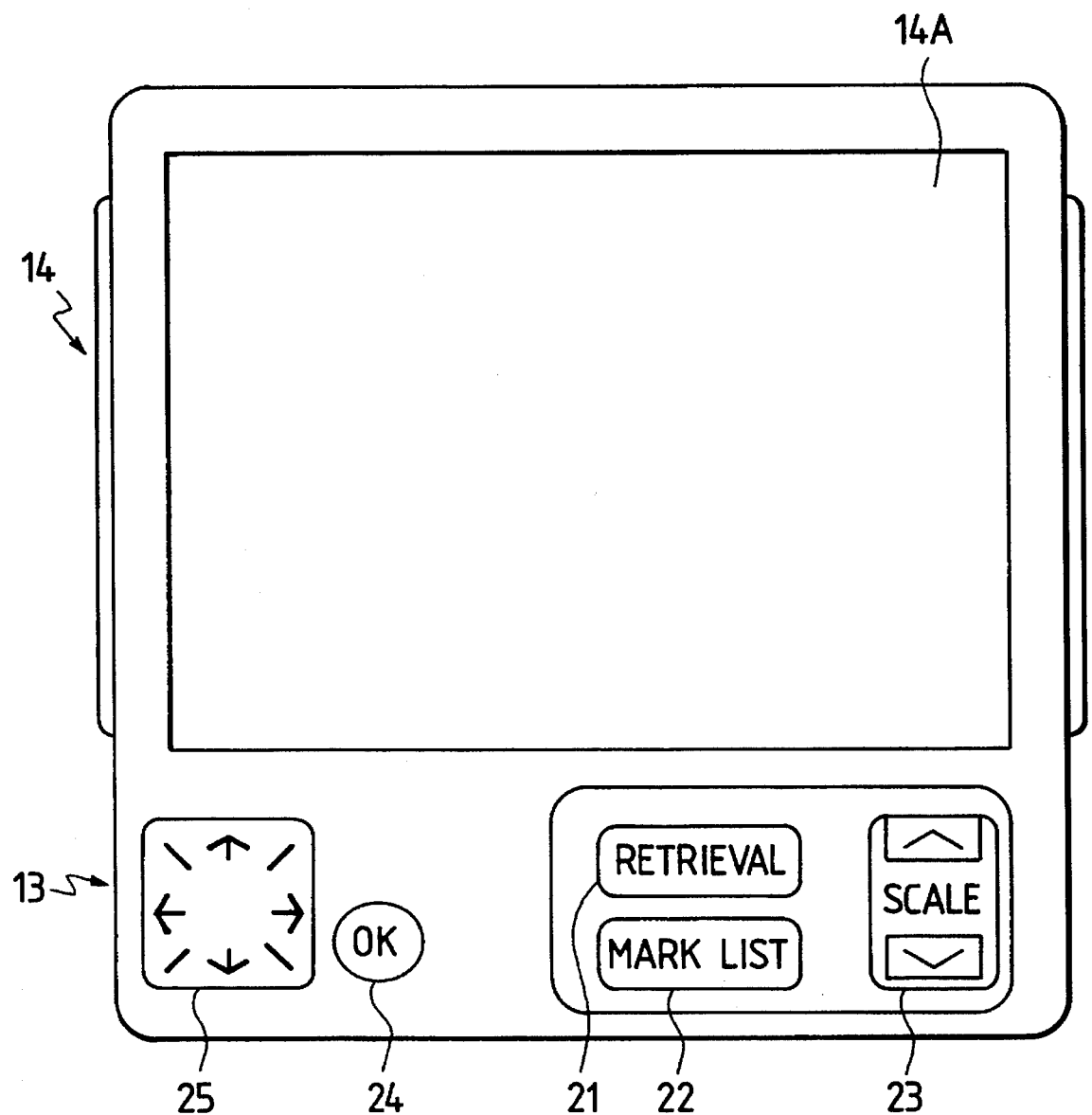

FIG. 4

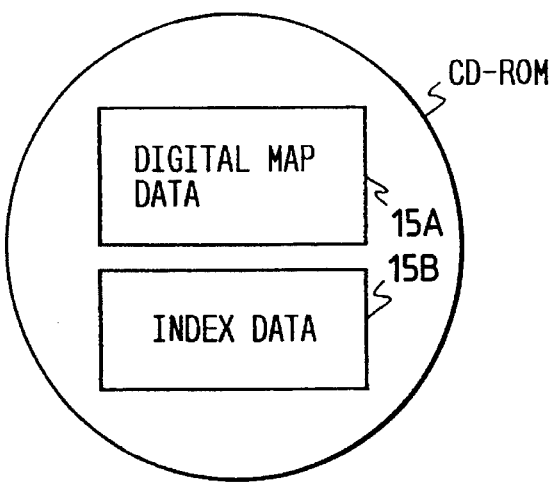

FIG. 5

| KEYWORD | NAME (PLACE NAME) | ATTRIBUTION | POSITION (LAT. & LONG.) |
|---|---|---|---|
| LEXINGTON ST. | ALASKA VALDEZ LEXINGTON ST. | ADMINISTRATIVE PLACE NAME | LAT. 50°N. AND LONG. 12°E |
| LEXINGTON ST. | ARIZONA PRESCOTT LEXINGTON ST. | ADMINISTRATIVE PLACE NAME | LAT. 12°N. AND LONG. 15°E |
| LEXINGTON ST. | ILLINOIS DECATUR LEXINGTON ST. | ADMINISTRATIVE PLACE NAME | LAT. 40°N. AND LONG. 13°E |
| LEXINGTON ST. | INDIANA ANDERSON LEXINGTON ST. | ADMINISTRATIVE PLACE NAME | LAT. 20°N. AND LONG. 14°E |
| LEXINGTON ST. | OREGON SALEM LEXINGTON ST. | ADMINISTRATIVE PLACE NAME | LAT. 25°N. AND LONG. 16°E |
|  |  |  |  |
|  |  |  |  |

FIG. 6

| NAME (PLACE NAME) | POSITION (LAT. & LONG.) |
|---|---|
| CAROLINA CHARLOTT MAIN STREET | LAT. 13°N. AND LONG. 21°E |
| COLORADO ALAMOSA CENTRAL CITY | LAT. 18°N. AND LONG. 25°E |
|  |  |
|  |  |
|  |  |
|  |  |

FIG. 8

INPUT PLACE NAME, FACILITY NAME OR ROUTE NAME FOR RETRIEVAL AND DISPLAY OF MAP.

RETRIEVAL NAME

[          31        ]  [ DELETE ALL ]

[ DELETE ONE LETTER ]

| Q | W | E | R | T | Y | U | I | O | P |
|---|---|---|---|---|---|---|---|---|---|
|   | A | S | D | F | G | H | J | K | L |
|   |   | Z | X | C | V | B | N | M |   |

| 5 | 0 |
|---|---|
| 6 | 1 |
| 7 | 2 |
| 8 | 3 |
| 9 | 4 |

( EXECUTE RETRIEVAL )

[RETRIEVAL RESULT]   NUMBER OF HIT:3   PUSH "OK KEY" FOR DISPLAY OF MAP

| ATTRIBUTION | NAME (PLACE NAME) |
|---|---|
| ADMINISTRATIVE PLACE NAME | ALABAMA GARDEN CITY 1ST STREET |
| ADMINISTRATIVE PLACE NAME | ALABAMA GARDEN CITY 2ND STREET |
| ADMINISTRATIVE PLACE NAME | ALABAMA GARDEN CITY 3RD STREET |
|  |  |
|  |  |
|  |  |
|  |  |
|  |  |

[MARK SPOT LIST]      PUSH "OK KEY" FOR DISPLAY OF MAP

| NAME | POSITION INFORMATION | |
|---|---|---|
| ALASKA GARDEN CITY 1ST STREET | LAT. 33N. & LONG. 88E. | ← |
| CAROLINA CHARLOTTE MAIN STREET | LAT. 13N. & LONG. 21E. | |
| COLORADO ALAMOSA CENTRAL CITY | LAT. 18N. & LONG. 25E. | |
|  |  | |
|  |  | |
|  |  | |
|  |  | |

GEOGRAPHIC INFORMATION DISPLAY APPARATUS

BACKGROUND OF THE INVENTION

1. Field of the Invention

The present invention relates to a positioning or navigation system of a vehicle, and more particularly to a geographic information display apparatus having a function of retrieving geographic information such as, place name, facility name and route name.

2. Prior Art

A GPS (i.e. global positioning system), which is a positioning or navigation system designed to use a plurality of satellites to provide a user anywhere on earth with extremely accurate measurements of its three-dimensional position, has been recently popularized. And, therefore, the development of systems calculating the current position of a mobile object based on such GPS technologies is remarkably progressing.

A CD-ROM (i.e. compact disc ROM) is a recording medium preferably used for such positioning or navigation systems. Electronic maps stored in this CD-ROM have a standardized format, in conformity with which a variety of CD-ROM software are already placed on the market. Thus, development of a system for effectively reproducing or displaying such information of CD-ROM software, i.e. an advanced geographic information display system, is now earnestly expected.

A conventional geographic information display apparatus has a function of registering place names, route names or facility names by pointing a mark spot on the displayed map, so that a designated mark spot and its name memorized in a memory are paired with each other in a "mark spot list". Thus, when a user requests display of a previously marked map, the mark spot list is first displayed on the screen, and then the user is allowed to select a desired one item among registered names on the list. After that, the system automatically displays a map corresponding to thus selected item.

However, this conventional registering function is characterized by unconditional registering which automatically memorizes a name closest to the mark spot regardless of the user's intention. More specifically, according to such a conventional geographic information display apparatus, the names registered are not always adequate for retrieval because the name memorized by a marking operation is the name closest to the marking spot which may not reflect the user's intention. Accordingly, the registered name is possibly different from the name the user intends to register. For example, if a route name such as "Route 66" is located very close to the mark spot, this name will be automatically registered but may not be preferable for the name to be registered because a road such as "Route 66" generally extends long distances and therefore is inconvenient for the user to designate as a spot name.

SUMMARY OF THE INVENTION

Accordingly, in view of above-described problems encountered in the prior art, a principal object of the present invention is to provide a geographic information display apparatus assuring higher convenience and easy to use.

In order to accomplish this and other related objects, a first aspect of the present invention provides a geographic information display apparatus comprising: memory means for memorizing graphic data of maps, terminological information representing various names including place names, route names and facility names on maps, position information representing latitude and longitude data corresponding to the names, and index information including a number of names to be retrieved as a designated name; readout means for reading out a desirable information from the memory means; display means for displaying the information read out by the readout means; retrieval means for executing a retrieval operation using the index information of the memory means on the basis of a name inputted by input means; the input means selecting one of resultant names after the retrieval operation of the retrieval means is finished; the display means displaying a map corresponding to the name selected by the input means; register means for registering, in response to designation of one spot on the map displayed on the display means, the one spot in terms of position information paired with the selected name; and the readout means reading out names stored in the register means, and the display means displaying the names read out by the readout means, and further the input means selecting one of the names displayed on the display means, and control means for controlling the readout means to read out a map corresponding to the one of names selected by the input means on the basis of the position information, and controlling the display means to display the map read out by the readout means.

Furthermore, a second aspect of the present invention provides a geographic information display apparatus comprising: memory means for memorizing graphic data of maps, terminological information representing various names including place names, route names and facility names on maps, position information representing latitude and longitude data corresponding to the names, and index information including a number of names to be retrieved as a designated name; readout means for reading out a desirable information from the memory means; display means for displaying the information read out by the readout means; retrieval means for executing a retrieval operation using the index information of the memory means on the basis of a name inputted by input means; the input means selecting one of resultant names after the retrieval operation of the retrieval means is finished; the display means displaying a map corresponding to the name selected by the input means; register means for registering, in response to designation of one spot on the map displayed on the display means, the one spot in terms of position information paired with the selected name; add means for overwriting a mark at the designated one spot on the map displayed on the display means; and the readout means reading out names stored in the register means, and the display means displaying the names read out by the readout means, and further the input means selecting one of the names displayed on the display means, and control means for controlling the readout means to read out a map affixing the mark thereon on the basis of the position information, and controlling the display means to display the map read out by the readout means.

BRIEF DESCRIPTION OF THE DRAWINGS

The above and other objects, features and advantages of the prevent invention will become more apparent from the following detailed description which is to be read in conjunction with the accompanying drawings, in which:

FIG. 3 is a view showing an appearance of the input section and the display section of the geographic information display apparatus in accordance with the embodiment of the present invention;

FIG. 4 is a diagram illustrating data structure of a CD-ROM medium used in the CD-ROM control section of the geographic information display apparatus in accordance with the embodiment of the present invention;

FIG. 5 is a diagrams illustrating data structure of an index data of the CD-ROM medium used in the CD-ROM control section of the geographic information display apparatus in accordance with the embodiment of the present invention;

FIG. 6 is a diagram illustrating data structure of a mark spot table stored in a backup RAM of the geographic information display apparatus in accordance with the embodiment of the present invention;

FIG. 8 is a view showing a retrieval input screen displayed on the display section of the geographic information display apparatus in accordance with the embodiment of the present invention;

DETAILED DESCRIPTION OF THE PREFERRED EMBODIMENT

Hereinafter, a preferred embodiment of the present invention will be explained in detail with reference to the accompanying drawings.

Figure 1:
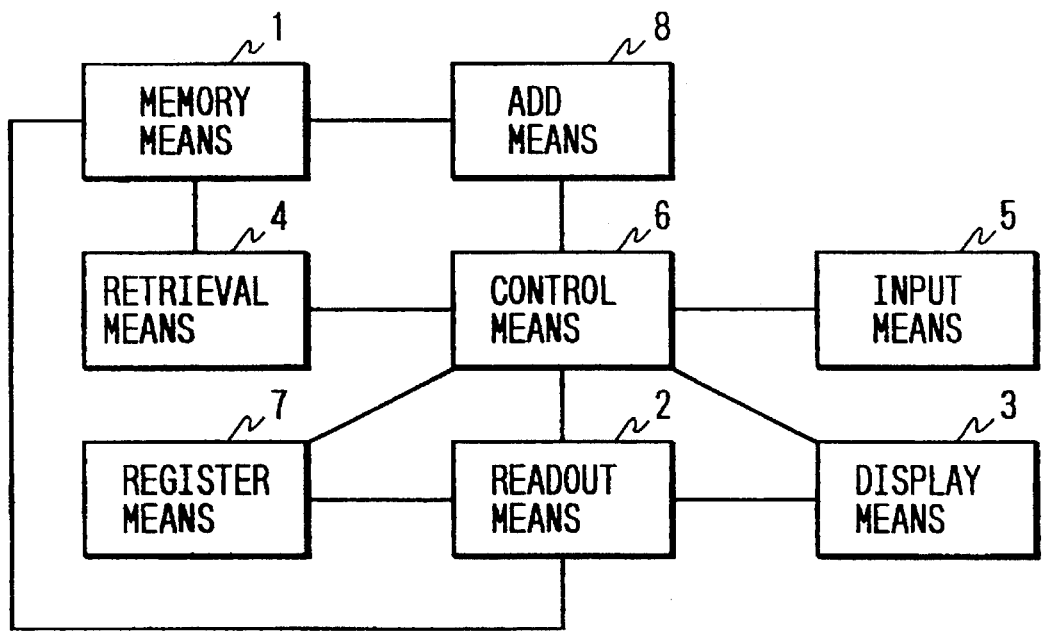
FIG. 1 is a block diagram showing one embodiment of a geographic information display apparatus in accordance with the present invention.

FIG. 1 is a block diagram showing one embodiment of a geographic information display apparatus in accordance with the present invention. A memory means 1 memorizes graphic data of maps, terminological information representing various names such as place names, route names and facility names on maps, position information representing absolute latitude and longitude data corresponding to respective names, and index information including a number of names to be retrieved as a designated name. A readout means 2 responds to an information-designating input instruction and reads out the designated information from the memory means 1. A display means 3 displays the information read out by the readout means 2. A retrieval means 4 executes a retrieval operation using the index information of the memory means 1 on the basis of the name inputted by an input means 5. The input means 5 allows a user to input various inputs, including instructions.

When the input means selects one of a plurality of resultant names according to a user's instruction after the retrieval operation of the retrieval means 4 is finished, a control means 6 causes the display means 3 to display a map corresponding to the selected name. Upon the user's designation of one spot on the displayed map, the control means 6 causes a register means 7 to register the designated spot in terms of the position information (i.e. latitude and longitude data) with respect to the selected name.

An adding means 8 allows the user to add a mark on the map information of the memory means 1.

Next, with reference to the FIG. 2, a circuit diagram of the embodiment of the present invention will be explained below.

Figure 2:
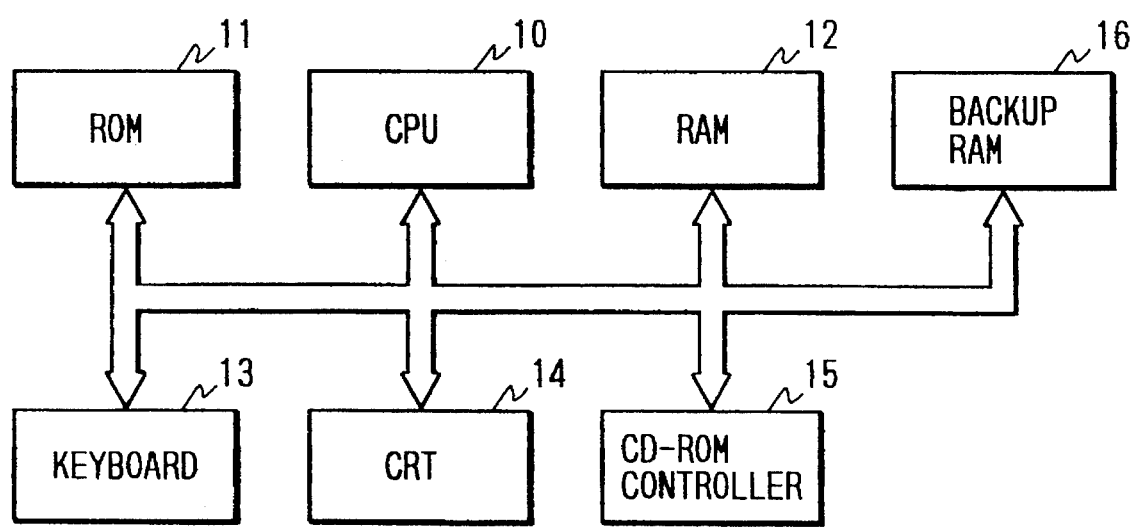
FIG. 2 is a circuit block diagram of the geographic information display apparatus in accordance with the embodiment of the present invention.

In FIG. 2, a reference numeral 10 represents a central processing unit (referred to as CPU hereinafter), which is constituted by a micro computer and operates according to the program memorized in a ROM 11. A reference numeral 12 represents a RAM which functions as a main memory, a reference numeral 13 represents a keyboard which is manipulated by the user, a reference numeral 14 represents a CRT (i.e. cathode-ray tube) with a screen on which various geographic data and information are displayed, a reference numeral 15 represents a CD-ROM controller which executes a control of a CD-ROM, and a reference numeral 16 represents a backup RAM backed up by a backup power source such as Lithium battery which is active even after a main electric power source of the system is turned off.

Next, with reference to FIG. 3, the input section (i.e. keyboard 13) and the display section (i.e. CRT 14) will be explained in more detail.

The CPU 10, which operates in accordance with the program of the ROM 11 using the RAM 12 as a main memory, responds to each input of user's instructions given through the keyboard 13, which includes a retrieval key 21, a mark list key 22, a scale key 23, an OK key 24, and a cursor key 25. Upon reception of a user's instruction, the CPU 10 actuates the CD-ROM controller 15 to read out the requested map data from the CD-ROM, and constructs the map data read out for display on a display screen 14A of the CRT 14, thereby enabling the user to access a desired map.

FIG. 4 is a schematic diagram illustrating the data structure of a CD-ROM medium (i,e, the memory means 1 of FIG. 1) which essentially consists of digital map data 15A for graphic display of map and index data 15B for retrieval of place names and so on.

The digital map data 15A are a bunch of digital data for displaying maps which includes absolute positions in terms of latitudes and longitudes together with depiction data, so that a specific depiction data can be accessed by designating its latitude and longitude data.

The index data 15B, having a data structure shown in FIG. 5, includes a data region "KEYWORD" whose content is expressed by alphabetic characters and/or numbers and arranged in ascending order; each item of "KEYWORD" acts as a retrieval key for identifying each record. Besides the "KEYWORD", the index data 15B are categorized into three data regions of "NAME", "ATTRIBUTION" and "POSITION".

The data group of "NAME" generally contains various kinds of names appearing on a map, for example, "LEXINGTON STREET, ALASKA" as a place name or "THE NATIONAL CENTRAL MUSEUM" as a facility or building name. The data group "ATTRIBUTION" represents the type of name, each expressed by letters such as "ADMINISTRATIVE PLACE NAME" and "FACILITY NAME".

Furthermore, the data group of "POSITION" stores numerical data in terms of the combination of latitude and longitude values, each combination representing the absolute position.

The register means 7 of this embodiment (i.e. the backup RAM 16) stores a mark spot list whose format is shown in FIG. 6. Mark information on this mark spot list identifies a mark spot name together with its geographical position and, therefore, the data area of this mark spot list is divided into two, "NAME" and "POSITION (LAT. & LONG.)", regions.

Figure 7:
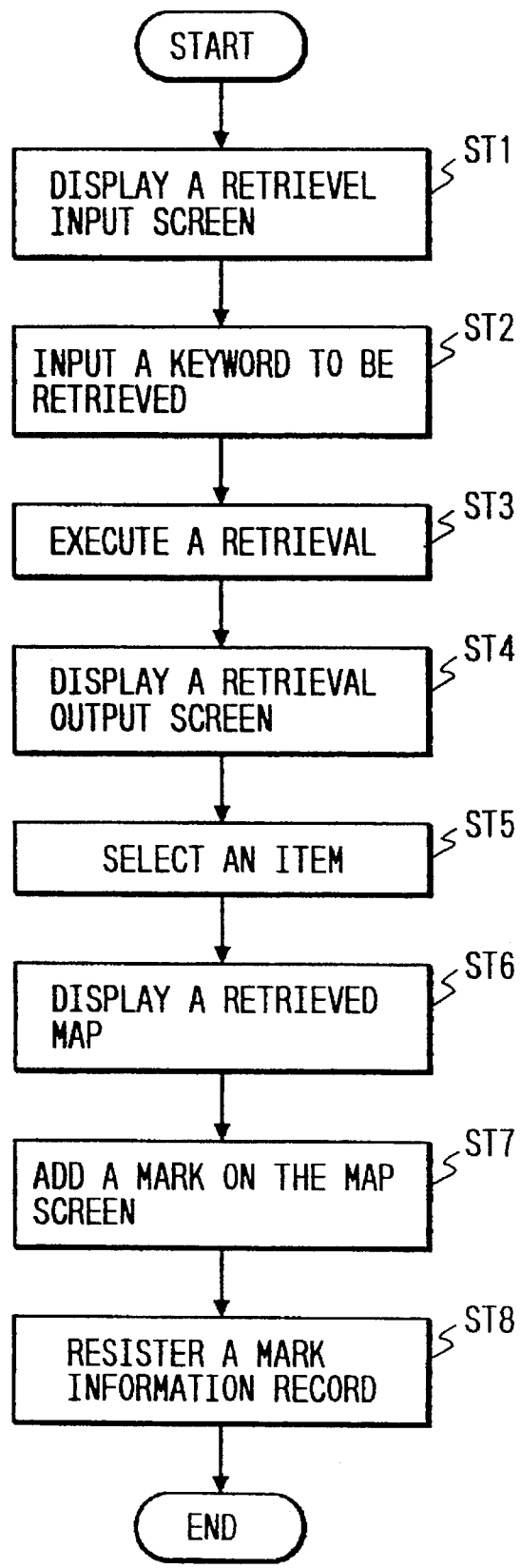
FIG. 7 is a flowchart illustrating the registering operation of a mark spot in accordance with the embodiment of the present invention.

An operation of the preferred embodiment of the present invention thus arranged will be explained hereinafter with reference to the flowchart of FIG. 7.

First of all, when a user's instruction is inputted through the input means 5 (i.e. the retrieval key 21 on the keyboard 13), a retrieval input screen shown in FIG. 8 is displayed on the screen of the display means 3 (i.e. on the display screen 14A of the CRT 14). (Step ST1) While the display means 3 displays the retrieval input screen of FIG. 8, the operator is allowed to input a keyword into a space 31 for entering a name to be retrieved using the cursor key 25 and the OK key 24. (Step ST2) Assuming that an entered keyword is "GARDEN CITY 1ST.", the control means 8 instructs the retrieval means 4 to execute a retrieval operation of the designated name "GARDEN CITY 1ST.". Thus, the retrieval means executes the retrieval operation by picking up or finding out a record containing the same letters from the index information in the memory means 1. (Step ST3)

Figures 9, 10:
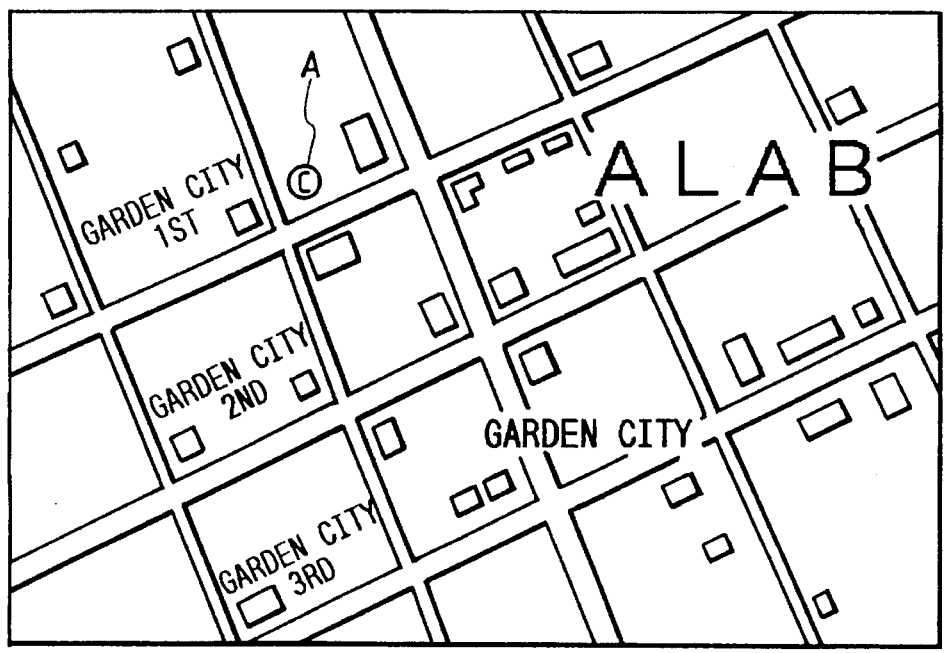
FIG. 9 is a view showing a retrieval output screen displayed on the display section of the geographic information display apparatus in accordance with the embodiment of the present invention.
FIG. 10 is a view showing a sample of an electronic map to be displayed in accordance with the embodiment of the present invention.

Subsequently, the readout means 2 reads out the information retrieved by the retrieval means 4 and the display means 3 displays a retrieval output screen having a format shown in FIG. 9 which shows all the resultant or hit items obtained through the retrieval. (Step ST4) If a plurality of items are included in this retrieval output list, the operator selects one of them using the input means 5 (i.e. the scale key 23 and the OK key 24 on the keyboard 13). For example, "ALASKA GARDEN CITY 1ST." of FIG. 9 is selected. (Step ST5) Next, a map corresponding to the selected item, i.e. a map showing the selected place name "ALASKA GARDEN CITY 1ST.", is displayed on the screen of the display means 3 as shown in FIG. 10. (Step ST6)

Figures 11, 12:
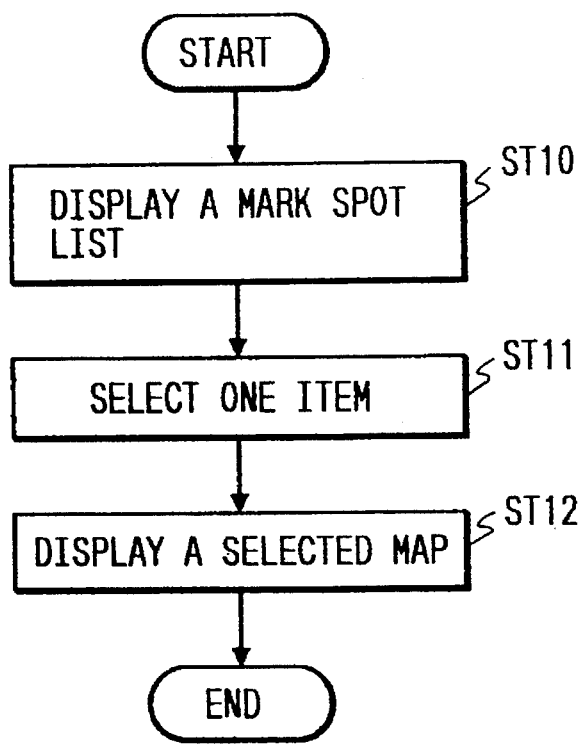
FIG. 11 is a flowchart illustrating a map reading out operation referring to a mark spot in accordance with the embodiment of the present invention.
FIG. 12 is a view showing a mark spot list screen displayed on the display section of the geographic information display apparatus in accordance with the embodiment of the present invention.

Thereafter, the user is allowed to put or add a mark spot A at a desirable place on the map displayed on the screen of the display means 3. The control means 6 causes the add means 8 to overwrite the mark on the map information (i.e. the digital map data 15A) in the memory means 1. (Step ST7) In accordance with the suggestion of the mark spot A, the control means 6 causes the register means 7 to register the selected place name "ALASKA GARDEN CITY 1ST." paired with its position information (i.e., LAT. 33.N. and LONG. 88.E.) into the mark spot list of FIG. 6, the result of which is shown in FIG. 12. (Step ST8)

Next, a reading out operation of the mark spot list will be explained with reference to the flowchart of FIG. 11.

Upon user's request through the input means 5 (i.e. manipulation of tile mark list key 22 on the keyboard 13), the control means 6 causes the readout means 2 to read out the mark spot list, registered in the register means 7. The mark spot list thus read out is displayed on the screen of the display means 3. (Step ST10) Next, the user is allowed to select one item on the mark spot list, for example, "ALASKA GARDEN CITY 1ST.", using the input means 5 (i.e. the scale key 23 and the OK key 24 on the keyboard 13). (Step ST11) In response to the user's selection, the control means 6 causes the readout means 2 to read out a map corresponding to the selected item with reference to the position information (i.e. latitude and longitude data) of that selected item. The map read out in this manner is displayed on the screen of the display means 3. (Step ST12) As a result, the map affixing the mark A thereon is displayed on the screen of the display means 3.

As this invention may be embodied in several forms without departing from the spirit of essential characteristics thereof, the present embodiment as described is therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A geographic information display apparatus comprising:

memory means for memorizing graphic data of a plurality of maps, terminological information representing various names including place names, route names and facility names on maps, position information representing latitude and longitude data corresponding to said various names, and index information including a number of names to be retrieved as a designated name;

readout means for reading out a desirable information from said memory means;

display means for displaying the information read out by said readout means;

retrieval means for executing a retrieval operation using said index information of said memory means on the basis of a name inputted by a user through an input means;

said input means allowing the user to select one of resultant names after said retrieval operation of said retrieval means is finished;

said display means displaying one of the maps stored in said memory means in response to the name selected by the user with said input means;

register means for responding to designation by the user of one spot on said map displayed on said display means, and registering said one spot defined in terms of position information paired with the selected name; and said readout means reading out names stored in said register means, and said display means displaying said names read out by said readout means, and further said input means allowing the user to select one of said names displayed on said display means, and control means for controlling said readout means to read out one of the maps stored in said memory means in response to said one of names selected by the user with said input means on the basis of said position information, and controlling said display means to display said map read out by said readout means.

2. A geographic information display apparatus in accordance with claim 1, wherein said memory means is a CD-ROM.

3. A geographic information display apparatus in accordance with claim 2, wherein said CD-ROM has a data structure essentially consisting of digital map data for graphic display of a map and related index information for retrieval operation.

4. A geographic information display apparatus in accordance with claim 3, wherein said index data has a data structure including a data region for keywords acting as a retrieval key.

5. A geographic information display apparatus in accordance with claim 4, wherein said keywords are expressed by alphabets and/or numbers and arranged in ascending order.

6. A geographic information display apparatus in accordance with claim 4, wherein said index data further includes data regions for names, attributions and positions.

7. A geographic information display apparatus in accordance with claim 6, wherein said data region for names contains various kinds of names appearing on a map.

8. A geographic information display apparatus in accordance with claim 6, wherein said attributions represent type of names.

9. A geographic information display apparatus in accordance with claim 6, wherein said data region for positions stores numerical data in terms of combination of latitude and longitude values, each combination representing absolute position.

10. A geographic information display apparatus in accordance with claim 1, wherein said register means stores a mark spot list, whose information is divided into two categories of name and position so that a mark spot can be identified by a name together with a corresponding geographical position.

11. A geographic information display apparatus in accordance with claim 10, wherein said register means is a backup RAM backed up by a backup power source which is active even after a main electric power source of the system is turned off.

12. A geographic information display apparatus in accordance with claim 1, wherein said display means is a CRT.

13. A geographic information display apparatus comprising:

memory means for memorizing graphic data of a plurality of maps, terminological information representing various names including place names, route names and facility names on said maps, position information representing latitude and longitude data corresponding to said various names, and index information including a number of names to be retrieved as a designated name;

readout means for reading out a desirable information from said memory means;

display means for displaying the information read out by said readout means;

retrieval means for executing a retrieval operation using said index information of said memory means on the basis of a name inputted by a user through input means;

said input means allowing the user to select one of resultant names after said retrieval operation of said retrieval means is finished;

said display means displaying one of the maps stored in said memory means response to the name selected by the user with said input means;

register means for responding to designation by he user of one spot on said map displayed on said display means, and registering said one spot defined in term of position information paired with the selected name;

add means for writing a mark at said designated one spot on said map displayed on said display means; and said readout means reading out names stored in said register means, and said display means displaying said names read out by said readout means, and further said input means allowing the user to select one of said names displayed on said display means, and control means for controlling said readout means to read out one of the maps stored in said memory means and having said mark affixed thereon on the basis of said position information, and controlling said display means to display said map read out by said readout means.

14. A geographic information display apparatus in accordance with claim 13, wherein said memory means is a CD-ROM.

15. A geographic information display apparatus in accordance with claim 14, wherein said CD-ROM has a data structure essentially consisting of digital map data for graphic display of a map and related index information for retrieval operation.

16. A geographic information display apparatus in accordance with claim 15, wherein said index information has a data structure including a data region for keywords acting as a retrieval key.

17. A geographic information display apparatus in accordance with claim 16, wherein said keywords are expressed by alphabets and/or numbers and arranged in ascending order.

18. A geographic information display apparatus in accordance with claim 16, wherein said index data further includes data regions for names, attributions and positions.

19. A geographic information display apparatus in accordance with claim 18, wherein said data region for names contains various kinds of names appearing on the map.

20. A geographic information display apparatus in accordance with claim 18, wherein said attributions represent type of names.

21. A geographic information display apparatus in accordance with claim 18, wherein said data region for positions stores numerical data in terms of a combination of latitude and longitude values, each combination representing absolute position.

22. A geographic information display apparatus in accordance with claim 13, wherein said register means stores a mark spot list, whose information is divided into two categories of name and position so that a mark spot can be identified by a name together with a corresponding geographical position.

23. A geographic informatin display apparatus in accordance with claim 22, wherein said register means is a backup RAM backed up by a backup power source which is active even after a main electric power source of the system is turned off.

24. A geographic information display apparatus in accordance with claim 13, wherein said display means is a CRT.

\* \* \* \* \*